July 12, 1932.                L. McK. FIELD                1,866,762
                              SPRING DEVICE
                           Filed Jan. 30, 1931

Inventor
L. M. Field
By Hull, Birch & West
Attorney

Patented July 12, 1932

1,866,762

UNITED STATES PATENT OFFICE

LLOYD McKINSEY FIELD, OF CLEVELAND HEIGHTS, OHIO, ASSIGNOR TO THE VAN COIL COMPANY, OF CLEVELAND, OHIO, A CORPORATION OF OHIO

SPRING DEVICE

Application filed January 30, 1931. Serial No. 512,259.

This invention relates to an improved spring device especially adaptable for use in connection with motor vehicles for resisting the approach of the axle and frame toward each other. The principal object of the invention is to provide a device of this type which shall be of simple construction and highly efficient and durable. A further object of the invention is to provide a simple and inexpensive connection between the bracket which supports the coil spring and is attached to the vehicle frame and the coil spring itself.

Figure 1:
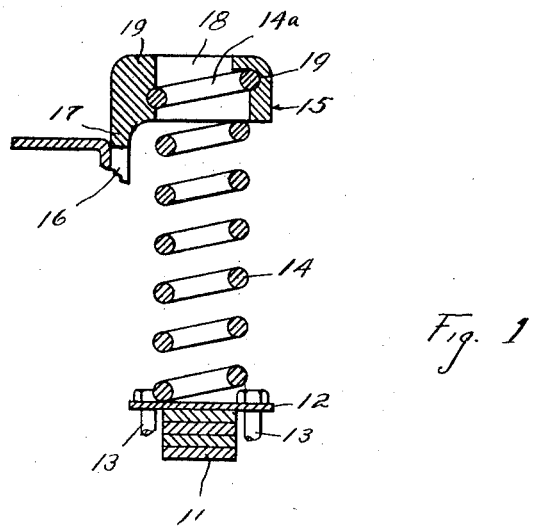
Figure 2:
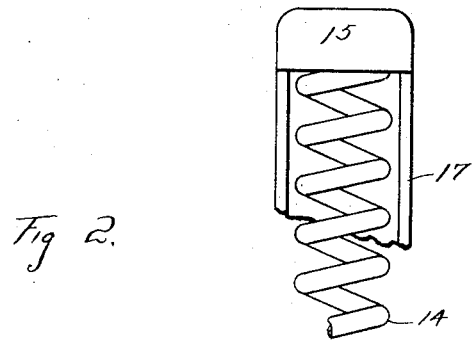

Other and more limited objects will become apparent from the following description when taken in connection with the accompanying drawings in which Fig. 1 is a fragmentary vertical sectional view taken through the vehicle frame, the spring supporting bracket, the spring which forms a part of the spring device and the main semi-elliptical spring of the vehicle itself; and Fig. 2 is a fragmentary elevational view looking at right angles to the showing of Fig. 1.

Referring now to the accompanying drawings, the numeral 10 indicates a fragment of the main frame member of the vehicle. 11 indicates a section of the main spring of the vehicle while 12 and 13 indicate a clamping plate and bolts respectively by which the spring 11 is connected to the vehicle axle (not shown). The plate 12 also serves as a buffing surface against which the free lower end of a coil spring 14 may engage. Attached to the frame member 10 is a spring supporting bracket 15 which may be connected thereto by bolts passing through a slot 16 or in any other suitable manner. It is to be understood that the length of the downwardly extending portion 17 of the bracket 15 will be longer or shorter in accordance with the frame member 10 and the manner of securement thereto.

The bracket 15 is provided with a socket 18 which may extend entirely therethrough as shown. The socket 18 is generally cylindrical in form and provided with a thread or thread-like groove 19 adapted to receive an enlarged upper convolution 14ᵃ of the spring 14. The thread or groove 19 will be shaped to conform to the enlargement of the enlarged convolutions, while being enough smaller than the shape said convolutions tend to take that the spring will be firmly gripped and prevented from rattling. The portion of the socket 18 below the enlarged convolutions will be cylindrical and of a diameter to receive snugly the convolutions of the spring which are not enlarged.

By means of the above described connection of bracket and coil spring I am able to secure an unreduced strength of the spring. The convolutions adjacent the enlarged ones simply move into the socket and rest each against the next above when the spring is compressed a sufficient amount.

While I have shown and described the preferred form of my invention, I wish it to be understood that the same is not limited to the details thereof except in accordance with the scope of the appended claims.

What I claim is:

1. A spring device adapted for securement to the frame member of a motor vehicle and including a bracket adapted to be secured in fixed relation to said frame member and a coil spring securely held by said bracket and adapted to engage against a portion of the vehicle movable with respect to said frame member, said bracket being provided with a spring receiving socket in which one end of said spring is received and held by its own resilience, the end of said spring which is received in said socket being enlarged.

2. A spring device adapted for securement to the frame member of a motor vehicle and including a bracket adapted to be secured in fixed relation to said frame member and a coil spring securely held by said bracket and adapted to engage against a portion of the vehicle movable with respect to said frame member, said bracket being provided with a spring receiving socket in which one end of said spring is received and held by its own resilience, the end of said spring which is received in said socket being enlarged, and the part of said socket below the enlarged spring portion being cylindrical and of a diameter to receive snugly the convolutions of said spring which are below the enlarged portion thereof.

3. A spring device including a bracket and a helical spring, said bracket being provided with a socket having a groove therein receiving an enlarged upper portion of said spring.

4. A spring device including a bracket and a helical spring, said bracket being provided with a socket having a groove therein receiving an enlarged upper portion of said spring, said socket having below said groove a cylindrical portion of a diameter substantially equal to the outside diameter of the unenlarged portion of said spring.

5. A spring device including a bracket and a helical spring, said bracket being provided with a socket having a groove therein receiving an enlarged upper portion of said spring, said bracket being provided with an extension adapted to be connected to a support and the other end of said coil spring being free.

6. A spring device including a bracket and a helical spring, said bracket being provided with a socket having a groove therein receiving an enlarged upper portion of said spring, said socket having below said groove a cylindrical portion of a diameter substantially equal to the outside diameter of the unenlarged portion of said spring, said bracket being provided with an extension adapted to be connected to a support and the other end of said coil spring being free.

In testimony whereof, I hereunto affix my signature.

LLOYD McKINSEY FIELD.